(12) United States Patent
Tiwari et al.

(10) Patent No.: US 10,977,441 B2
(45) Date of Patent: Apr. 13, 2021

(54) NORMALIZING ADDRESSES TO FACILITATE SORTATION AND ROUTING SOLUTION USING NATURAL LANGUAGE TEXT PROCESSING

(71) Applicant: Amazon Technologies, Inc., Seattle, WA (US)

(72) Inventors: Alok Tiwari, Maharashtra (IN); Rajat Arora, Maharashtra (IN); Bonney Varghese, Seattle, WA (US); Vamshi Surabhi, Sunnyvale, CA (US); Homayoun Taherian, Seattle, WA (US); Abhishek Verma, Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 16/173,368

(22) Filed: Oct. 29, 2018

(65) Prior Publication Data

US 2020/0134014 A1 Apr. 30, 2020

(51) Int. Cl.
| | | |
|---|---|---|
| *G06F 40/284* | (2020.01) | |
| *G06Q 10/08* | (2012.01) | |
| *G06N 20/00* | (2019.01) | |
| *G06F 16/29* | (2019.01) | |
| *G06F 16/35* | (2019.01) | |
| *G06F 40/211* | (2020.01) | |

(52) U.S. Cl.
CPC ............ *G06F 40/284* (2020.01); *G06F 16/29* (2019.01); *G06F 16/355* (2019.01); *G06F 40/211* (2020.01); *G06N 20/00* (2019.01); *G06Q 10/083* (2013.01)

(58) Field of Classification Search
CPC ...... G06F 16/29; G06F 40/211; G06F 16/355; G06F 40/284; G06Q 10/083; G06N 20/00
USPC .......................................................... 704/9
See application file for complete search history.

(56) References Cited

U.S. PATENT DOCUMENTS

| | | | | |
|---|---|---|---|---|
| 5,510,608 | A * | 4/1996 | Williams | B07C 3/18 |
| | | | | 209/584 |
| 9,043,205 | B2 * | 5/2015 | Mengibar | G06F 16/387 |
| | | | | 704/235 |
| 9,235,652 | B1 * | 1/2016 | Jeffery | G06F 16/254 |
| 10,133,995 | B1 * | 11/2018 | Reiss | G06Q 50/01 |
| 2005/0071385 | A1 * | 3/2005 | Rao | H04L 67/02 |
| 2007/0089174 | A1 * | 4/2007 | Bader | G06F 21/10 |
| | | | | 726/32 |
| 2008/0033738 | A1 * | 2/2008 | Conard | G07B 17/00435 |
| | | | | 705/1.1 |
| 2010/0082367 | A1 * | 4/2010 | Hains | G16H 40/67 |
| | | | | 705/2 |

(Continued)

*Primary Examiner* — Michael Colucci
(74) *Attorney, Agent, or Firm* — Patterson + Sheridan, LLP

(57) ABSTRACT

Techniques for routing items addressed to an unstructured address are described. One embodiment includes receiving an order for delivery of a first package, the order specifying a first address that does not comply with a defined address format. The first address is processed using one or more hybrid machine learning algorithms to determine a Normalized Delivery Location (NDL) associated with the first address. A sorting zone that encompasses the NDL is determined. The sorting zones correspond to a predefined geographic region. Embodiments facilitate transport of the first package to a physical shipping location within the predefined geographic region.

20 Claims, 11 Drawing Sheets

(56) References Cited

U.S. PATENT DOCUMENTS

| | | | |
|---|---|---|---|
| 2011/0060587 A1* | 3/2011 | Phillips | G10L 15/30 704/235 |
| 2012/0036132 A1* | 2/2012 | Doyle | G06F 16/355 707/738 |
| 2014/0343841 A1* | 11/2014 | Faaborg | G01C 21/3691 701/465 |
| 2015/0082183 A1* | 3/2015 | Hale | G06F 16/9537 715/738 |
| 2017/0017928 A1* | 1/2017 | Miller | G06Q 10/1095 |
| 2017/0228683 A1* | 8/2017 | Hu | G08G 1/00 |
| 2019/0005741 A1* | 1/2019 | Klausner | G07F 17/42 |
| 2019/0213272 A1* | 7/2019 | Wong | G06F 16/2379 |
| 2020/0120441 A1* | 4/2020 | Fonti | H04W 4/021 |

* cited by examiner

NORMALIZING ADDRESSES TO FACILITATE SORTATION AND ROUTING SOLUTION USING NATURAL LANGUAGE TEXT PROCESSING

BACKGROUND

The present invention relates to natural language text processing, and more specifically, to techniques for processing natural language text data specifying a delivery address to generate a normalized address to facilitate sortation and routing of delivery items.

In locations where addresses are not well defined and/or geocodes are not readily available, it is challenging to provide delivery services, particularly at scale. For instance, in locations where street names are not well defined, addresses may be defined relative to a known landmark, e.g., the address may be described as "behind a particular landmark" or "within a particular business park." While such a description may be adequate for someone familiar with the area, this sort of relative description is not particularly useful for implementing large scale delivery services, which typically rely on well-defined addresses and geocodes to ensure efficient and reliable deliveries.

DETAILED DESCRIPTION

Figure 1:
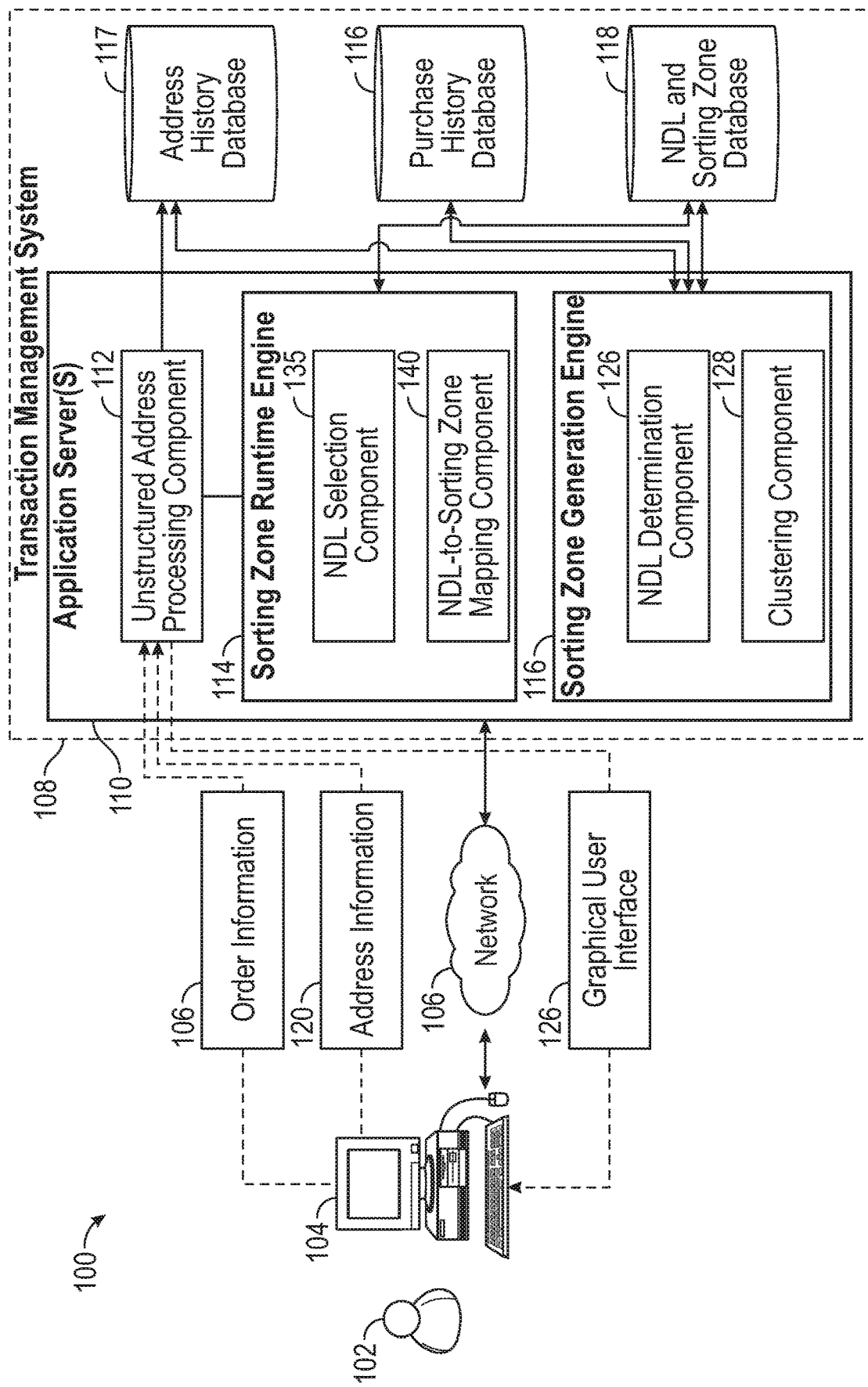
FIG. 1 is a block diagram illustrating a system and workflow for processing orders to shipping addresses that do not confirm to a well-defined format, according to one embodiment described herein.

Many developing locations and emerging marketplaces do not yet have well-defined addresses or geocodes, but instead rely on localized knowledge of the area to facilitate deliveries. For example, a given address may be described relative to a particular landmark or using descriptive language (e.g., the red house on the left), as opposed to well-defined address and geocodes. Because these descriptions rely on localized knowledge (e.g., familiarity with a particular neighborhood), these descriptions cannot be efficiently processed by conventional sortation and routing systems, which rely on specific address formats or other systems for precisely defining a geolocation. While delivery services can deliver packages to a regional location, where the packages can be handed off to courier who is intimately familiar with the region, each additional hand-off adds further cost and delay, and increases the chance that an issue arises in the delivery of the packages. As a result, it remains challenging to facilitate large scale delivery services to these developing locations.

As such, embodiments described herein provided techniques that utilize natural language processing (NLP) and hybrid machine learning algorithms to facilitate the routing of packages with addresses that do not comply with a defined routing format. According to one embodiment, a sorting zone assignment engine (e.g., sorting zone generation engine 116 shown in FIG. 1) is configured to process a plurality of electronic address records for a plurality of historical orders. For example, the electronic address records in the plurality of electronic address records could include natural language text data specifying a respective address. In one embodiment, at least one of the electronic address records in the plurality of electronic address records contains natural language text data that does not comply with a defined address format.

In one embodiment, the sorting zone generation engine 114 can process the plurality of electronic address records for the plurality of historical orders to identify a plurality of commonly used keywords that occur within the electronic address records. In doing so, the sorting zone generation engine 114 can first filter out one or more stop words (e.g., the, and, of, etc.) and other commonly used words within the addresses (e.g., lane, street, drive, etc.). The sorting zone generation engine 114 can then process the remaining words to determine a set of commonly used keywords within the addresses. In one embodiment, the sorting zone generation engine 114 is configured to determine the set of commonly used keywords on a per-region basis. For example, the sorting zone generation engine 114 could be configured to determine, for each recognized zip code, a respective set of commonly used keywords for addresses within the region defined by the zip code.

The sorting zone generation engine 114 could determine a plurality of Normalized Delivery Locations (NDLs) based on the natural language text data within the plurality of electronic address records and the identify set of commonly used keywords. Generally, as described herein, NDLs represent geographic locations that may be easily identifiable and may have geocodes that can be accurately captured. Examples of NDLs can include, without limitation, an apartment building, a university, a business park, a hospital institution campus, a particular building on the hospital campus, a monument, and so on. More generally, any named or otherwise identifiable (e.g., using a natural language text description) geographic location can be used as an NDL, consistent with the functionality described herein.

For each of the plurality of NDLs, the sorting zone generation engine 114 can determine a set of corresponding phrases of one or more words from the set of commonly used keywords. For example, the sorting zone generation engine 114 could determine that a particular apartment building can be referred to using the strings "ABC Apartment," "ABC Apartment Complex," ABC Apt." and so on. Additionally, the sorting zone generation engine 114 can determine a plurality of geolocations corresponding to the plurality of NDLs. For example, the sorting zone generation engine 114 could determine a set of Global Positioning System (GPS) coordinates that correspond to each of the NDLs.

The sorting zone generation engine 114 can generate a plurality of sorting zones by applying a clustering algorithm to the plurality of geolocations. In one embodiment, each of the sorting zones in the plurality of sorting zones corresponds to a cluster of one or more geolocations for one or more NDLs. For example, the sorting zone generation engine 114 could employ a k-means clustering algorithm, a k-means derivative clustering algorithm or more generally any suitable clustering algorithm to determine the clusters of geographic locations. In one embodiment, the number of clusters can be determined based on an available amount of physical space in a delivery center that can be dedicated to sorting bins. For example, where the delivery center assigns a sorting bin to each sorting zone (i.e., each cluster of one or more NDLs), the number of clusters can be limited to the amount of physical space available to house the sorting bins within the delivery center.

An address processing component (e.g., unstructured address processing component 112 shown in FIG. 1) can receive first address data for the delivery of a first package, wherein the first address data does not comply with a defined address format. For example, the first address data could describe the delivery location in relation to a known landmark (e.g., behind Building 7 of the university), as opposed to an address with a defined address format (e.g., "House/Apt number, Street Name, City, State, Zipcode" or another defined address format).

The unstructured address processing component 112 could forward the first address data to a sorting zone runtime engine 114 for processing. For example, the sorting zone runtime engine 114 could process the first address data using one or more hybrid machine learning algorithms to determine at least one NDL associated with the first address data. The sorting zone runtime engine 114 can identify a sorting zone that encompasses a first NDL of the at least one NDLs and generate a label for affixing to the first package, wherein the generated label specifies at least the identified sorting zone. Doing so enables efficient processing, sortation and routing of packages addressed to address that do not confirm to a well-defined format.

FIG. 1 is a block diagram illustrating a system and workflow for processing orders to shipping addresses that do not confirm to a well-defined format, according to one embodiment described herein. Generally, FIG. 1 and the following description are intended to provide a brief, general description of a suitable computing environment in which the embodiments described herein may be implemented. In particular, FIG. 1 is a system and network diagram that shows an illustrative operating environment 100 including several software components for processing packages addressed to addresses that do not conform to a well-defined format.

The environment 100 includes a user 102 that uses a client device 104 to access a transaction management system 108 across a network 106. The user 102 may be an individual or entity that desires to place an order, using the transaction management system 108, that is addressed to an address that does not conform to a well-defined format. The client device 104 may be a personal computer ("PC"), a desktop workstation, a laptop, a tablet computer, a notebook, a personal digital assistant ("PDA"), an electronic-book reader, a game console, a set-top box, a consumer electronics device, a server computer, or any other computing device capable of connecting to the network 106 and communicating, with the transaction management system 108.

The network 106 may be a local-area network ("LAN"), a wide-area network ("WAN"), the Internet, or any other networking topology known in the art that connects the client device 104 to the transaction management system 108. The transaction management system 108 may include a number of application servers 110 that provide various online web and application services to the client device 104 over the network 106. The user 102 may use a client application executing on the client device 104 to access and utilize the online web and application services provided by the application servers 110.

In one embodiment the client application is a web browser application. Generally, such a web browser application can exchange data with the application servers 110 in the transaction management system 108 using the hypertext transfer protocol ("HTTP") over the network 106. The client application could also be a stand-alone client application (e.g., a mobile application) configured for communicating with the application servers 110. The client application might also utilize any number of communication methods known in the art to communicate with the transaction management system 108 and/or the application servers 110 across the network 106, including remote procedure calls, SOAP-based web services, remote file access, proprietary client-server architectures, and the like.

The application servers 110 may execute a number of modules to provide web-based and other content to the client device 104. The modules may execute on a single application server 110 or in parallel across multiple application servers in the transaction management system 108. In addition, each module may consist of a number of subcomponents executing on different application servers 110 or other computing devices in the transaction management system 108. The modules may be implemented as software, hardware, or any combination of the two.

As shown, the application servers 110 include an unstructured address processing component 112, a sorting zone runtime engine 114 and a sorting zone generation engine 116. Additionally, the transaction management system 108 includes an address history database 117, a purchase history database 116 and a NDL and sorting zone database 118. In one embodiment, the transaction management system 108 can include a user profile database (not shown). Such a user profile database can contain data relating to various users of the transaction management system 108. For example, the user profile database could contain metadata describing each user (e.g., the user's name, saved physical addresses, default physical address, etc.), as well as preconfigured payment information for the user. As an example, credit card information for a particular user could be encrypted and securely stored within the user profile database, for use in processing transactions for the particular user.

As discussed above, embodiments described herein provide technical solutions to the technical problem of processing an electronic representation of an address containing natural language text that does not conform to a well-defined format. Generally, when packages are inducted in a shipping center, a sorting system is used to sort the packages based on the sub-locality. By pre-sorting the packages by sub-locality, the shipping center can deliver groups of packages to shipping couriers within the various sub-localities, thereby improving the efficiency and reliability of the delivery of the packages to their eventual destinations.

When sorting packages addressed to well-defined addresses, conventional solutions can be configured with logic to efficiently route these packages to various sub-localities on the way to their eventual destinations. However, when sorting packages, it can be challenging to determine which sub-locality a package belongs to when the address is not written in a well-defined format. These challenges are compounded in countries where geolocations are unavailable (e.g., due to limitations in cellular service) or are of inferior quality (i.e., less accurate).

In order to optimize incoming deliveries of packages and dispatch them in a more efficient manner, embodiments described herein provide computer systems that utilize hybrid machine learning algorithms and predefined sets of NDLs to manage the sortation and routing of packages that are not addressed to well-defined addresses. For example, a customer 102, using client devices 104, could submit a new order for one or more items (shown as order information 106) and could specify an unstructured address where the one or more items should be delivered (shown as address information 120) to the transaction management system 108. For example, consider the following unstructured address:

Development Centre India Pvt. Ltd, ABC Business Park, XYZ Road, Mahadevpura, Bangalore—560037

Example 1—Exemplary Address

Of note, unlike an address in a well-defined format (e.g., a format where the address specifies at least a house and/or apartment number, a street name, a city, a state or province, and a zip code), the address shown in Example 1 references a business named "Development Centre India Pvt. Ltd" that is located at the "ABC Business Park" on "XYZ Road." That is, the address in Example 1 defines the address in relation to the location of another landmark (i.e., the "ABC Business Park"), rather than using a defined format to explicitly describe the address of the business named "Development Centre India Pvt. Ltd" on "XYZ Road."

As a result, to perform sortation operations for such an address and to ultimately deliver to this address requires localized knowledge on the location of ABC Business Park and the surrounding area. While the customer-facing delivery agent is perhaps more likely to have this localized knowledge, there is a significant chance the delivery agent does not have this knowledge. More generally, however, conventional solutions do not implement such knowledge at the centralized sortation system level, and such an implementation presents a technical challenge, particularly when accounting for the number of different permutations of such informally formatted addresses. That is, one advantage of well-defined addresses and address formats is that the number of different permutations of addresses the sortation computing systems is configured to understand is reduced, and moreover such a sortation computing system can more efficiently process addresses and perform sorting operations when the addresses are well-defined.

In the depicted embodiment, the sorting zone generation engine 116 includes a NDL determination component 126 and a clustering component 128. The NDL determination component 126 can identify and mine order and address data (e.g., within the address history database 117 and purchase history database 116) of customers over a window of time (e.g., 6 months, 1 year, etc.). In one embodiment, the NDL determination component 126 performs such processing on a per-zip code basis. That is, a respective set of most commonly used keywords and a respective set of NDLs can be generated for each unique zip code recognized by the NDL determination component 126. Based on processing this order and address data, the NDL determination component 126 can identify patterns in the address strings stored within the data. The NDL determination component 126 can associate these patterns to landmarks (i.e., NDLs). For example, one or more of the most commonly used keywords with the region (e.g., as defined by the zip code) could be associated with each of the NDLs. In one embodiment, it is preferable for such landmarks to be easily identifiable and have geocodes that can be accurately captured.

Advantageously, by reducing the total set of unique natural language addresses down to a set of identified landmarks, the NDL determination component 126 can reduce the total number of distinct addresses the system needs to recognize significantly down to a much more manageable number (e.g., from millions down to several thousand distinct addresses). Once the NDLs are determined, the NDL determination component 126 can capture the geocodes of these addresses in the reduced set of addresses and can associate these geocodes with the determined NDLs. The NDL determination component 126 can then store the generated NDLs and their corresponding geocodes in the NDL and sorting zone database 118.

The sorting zone generation engine 116 can further define sortation using the reduced set of addresses in the fulfillment center/shipment processing center. For example, bins could be provided for landmarks or groups of landmarks and the packages can be sorted (e.g., using automated sorting systems, by associates, etc.) for delivery. However, as the number of NDLs in some zip codes may be significant, the clustering component 128 of the sorting zone generation engine 116 can perform a clustering algorithm on the geolocations of the NDLs to identify a predefined number of geolocation clusters, and the clustering component 128 of the sorting zone generation engine 116 can define these geolocation clusters as sorting zones. Such sorting zones and the NDLs they encompass can further be stored in the NDL and sorting zone database 118 by the clustering component 128.

As packages are processed by the sorting zone runtime engine 114, the NDL selection component 135 of the sorting zone runtime engine 114 can determine a NDL (e.g., from the set of NDLs corresponding to the package's zip code) that best matches the address of the package. The NDL-to-sorting zone mapping component 140 of the sorting zone runtime engine can then determine a sorting zone that encompasses the NDL. The sorting zone runtime engine 114 can then facilitate the routing of the package to the sorting zone. For example, the sorting zone runtime engine 114 could facilitate the generation of a physical label that specifies the sorting zone, and the physical label could be affixed to the package for use in sorting the package. A sorting system could then route the package to a bin corresponding to the sorting zone, and for the packages within a bin (i.e., all packages heading to a certain geolocation), these packages can be routed to another shipping center within the geographic region corresponding to the sorting zone. By doing so, embodiments can reduce the amount of local knowledge needed to facilitate the delivery of a package and reduces the ambiguity in processing a natural language text address that is not written according to a strictly defined format.

Figure 2:
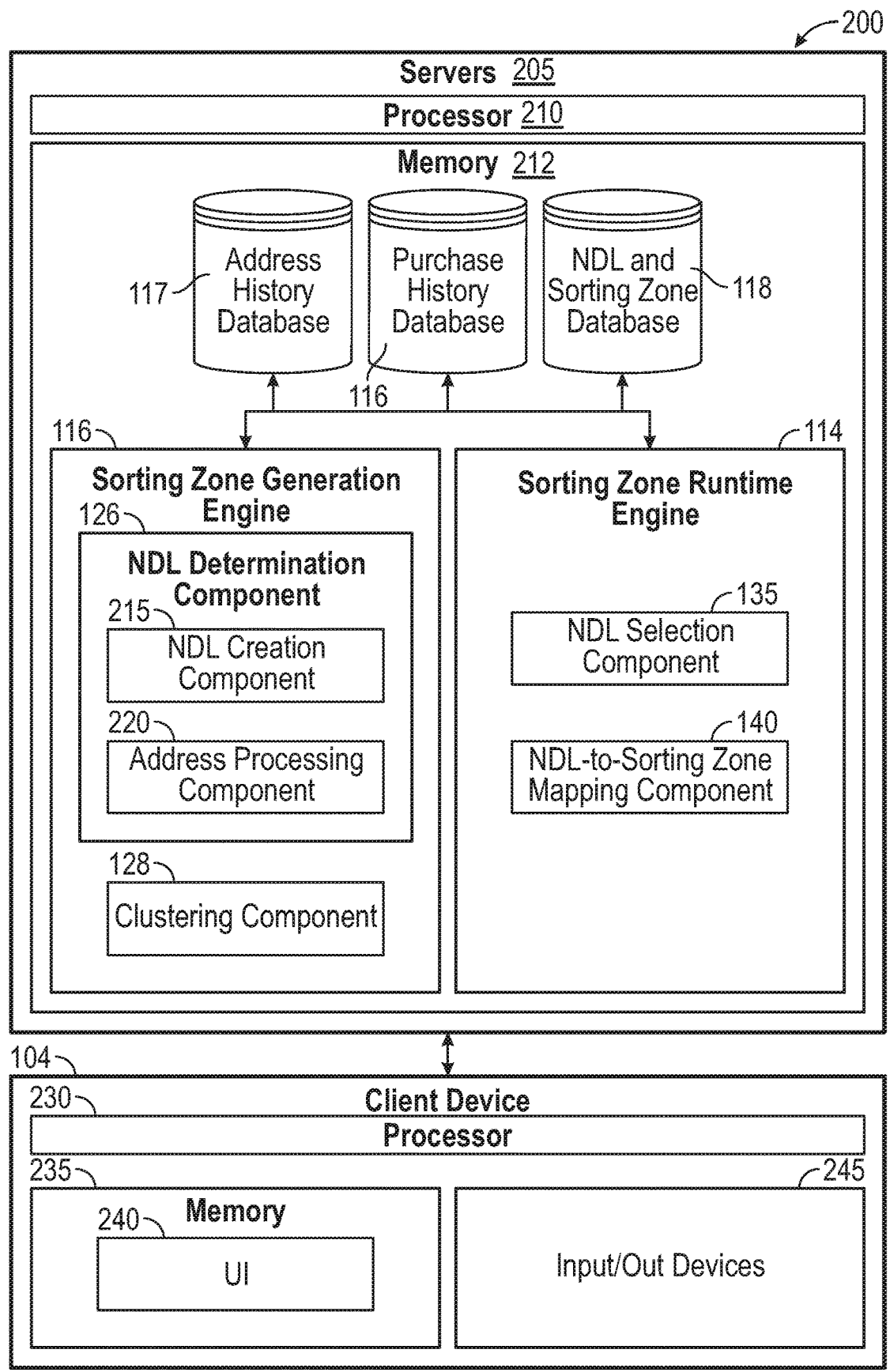
FIG. 2 is a block diagram illustrating a system configured with a sorting zone assignment engine, according to one embodiment described herein.

FIG. 2 is a block diagram illustrating a system configured with a sorting zone assignment engine, according to one embodiment described herein. As shown, the system 200 includes servers 205, which collectively provide processing capabilities 210 and memory 212. The memory 212 may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device.

Stored in the memory 212 are multiple data stores, including the address history database 117, the purchase history database 116, and the NDL and sorting zone database 118. The client device 104 has a processor 230, memory 235 (e.g., volatile, non-volatile, etc.) and input/output (I/O) devices 245. A user interface (UI) 240 is stored in the memory 235 and executed on the processor 230 to allow the client device 104 to access the servers 205 of service 106 and request various content items. In one implementation, the UI 240 corresponds to the client application described above. For example, the UI 240 could be provided by a web browser or other application that renders pages or content served by the servers 205. In one embodiment, the UI 240 represents an audio-based interface for a digital assistant service, where the user interacts with the UI 240 verbally (e.g., using a microphone device). Generally, the I/O devices 245 can include any device capable of providing output to users of the device (e.g., a display device for outputting images, a speaker device for outputting sounds, etc.) as well as any devices through which a user can provide input (e.g., a touchscreen device, a mouse, a keyboard, etc.).

As shown, the sorting zone runtime engine 114 includes the NDL selection component 126 and the NDL-to-sorting zone mapping component 140. Generally, the NDL selection component 126 can be configured to normalize addresses that do not conform to a well-defined format by relating these addresses to a recognize landmark (e.g., an NDL). For example, consider the exemplary address shown in Example 2:

50A, $3^{rd}$ floor, behind famous bakery, gali no 10, virender Nagar 110058

Example 2—Exemplary Address

In this example, "gali no 10" can refer to a particular lane within the neighborhood, and "behind famous bakery" describes the location in question relative to the location of a known landmark. While someone who possesses localized knowledge for the neighborhood and is otherwise familiar with the area would likely be able to understand such an address, as with other poorly defined addresses, such an address cannot be readily understood by a conventional sortation and routing control system. That is, since such systems typically are not configured with such localized knowledge, as the burden to configure the systems with localized knowledge for all locations within a region would be too great. As a result, packages with poorly defined addresses are frequently processed manually to determine the proper sortation and routing for the packages. However, such manual processing is expensive, time consuming and more error prone than automated solutions that process well-defined addresses, and moreover such manual processing simply does not scale nearly as well as automated processing solutions. Moreover, as many geocodes are less accurate or simply unavailable in many developing locales, the error rate for delivering packages with poorly defined addresses using conventional techniques is significant.

In the illustrated embodiment, the sorting zone generation engine 116 includes the NDL determination component 126 and clustering component 128. The NDL determination component 126 includes a NDL creation component 215 and an address processing component 220. Generally, the address processing component 220 is configured to process historical address information and the NDL creation component 215 can create a set of NDLs based on identified patterns (e.g., patterns of one or more commonly occurring keywords) within the historical address information. In doing so, the NDL creation component 215 can be configured to omit certain words or phrases that are determined to be ambiguous (e.g., using a predefined set of rules that, when satisfied, indicate a particular word is ambiguous in nature). For example, while the term "metro station" may be used in a significant number of addresses, a given zip code in an urban environment may contain multiple metro stations and thus the term "metro station" does not identify a unique landmark within the zip code (and thus can be determined to be ambiguous).

As discussed above, embodiments described herein can effectively divide a geographic area (e.g., a country, a region, etc.) into a plurality of NDLs. For example, a particular NDL could correspond to a landmark within the geographic area. Customer-specified addresses can then be processed and represented in relation to one of these NDLs. To this end, the sorting zone runtime engine 114 is generally configured to process addresses of incoming orders to identify a matching NDL(s), and the NDL selection component 135 is configured to select one of the matching NDLs that best matches the specified address.

Figure 3:
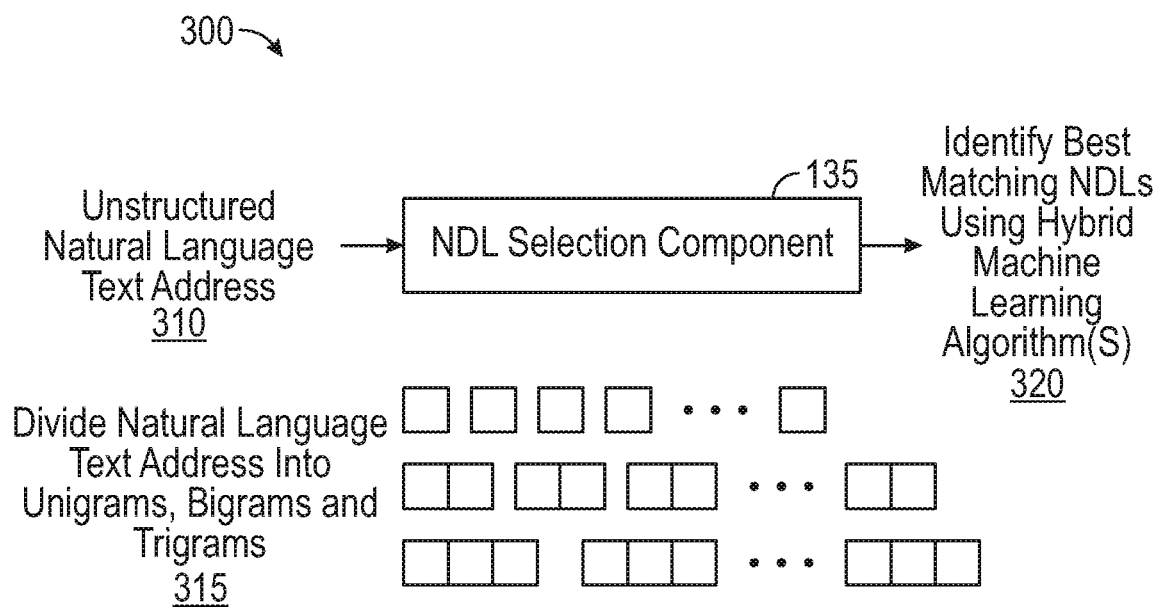
FIG. 3, which illustrates a workflow for processing natural language address text into n-grams, according to one embodiment described herein.

An example of such address processing is shown in FIG. 3, which illustrates a workflow for processing natural language address text into n-grams, according to one embodiment described herein. As shown, the workflow 300 illustrates a unstructured natural language text address 310 is transmitted to the NDL determination component 126. The NDL selection component 135 in the depicted embodiment is configured (at operation 315) to divide the incoming address into n-grams (e.g., unigrams, bigrams, trigrams, etc.) The NDL selection component 135 can then compare these n-grams with n-grams corresponding to NDLs in a set of previously defined NDLs and can identify a best matching NDL(s) using a hybrid machine learning algorithm(s) (operation 320). That is, a given NDL can be represented with a combination of multiple words, and in order to search multiple words, the NDL selection component 135 can break the words of a given address down into n-grams and can perform noise cancellation operations such as Levenshtein distance algorithms to help determine the best matching NDL for the given address.

Advantageously, by using a hybrid machine learning algorithm such as a Levenshtein distance, Soundex distance, and so on, the NDL determination component 126 can effectively filter out noise (e.g., simple misspellings) within addresses being processed. Moreover, through the use of such hybrid machine learning algorithms, the NDL selection component 135 can suggest NDLs for addresses even when no exact match is found.

As discussed above, the NDL selection component 135 can utilize defined NDLs to normalize informal or poorly defined addresses. Generally, a NDL refers to a geographic unit, with examples including (without limitation) buildings, complexes, colonies, landmarks, etc. When defining the set of known NDLs for a region, the NDL determination component 126 can process historical address information (e.g., addresses used for delivery locations over a window of time) and can determine a set of NDLs that are historically most commonly used in the region. The NDL determination component 126 can further perform a data mining operation on historical address information (e.g., a window of historical address information, such as all addresses for orders within the last 6 months), where embodiments take all of the known addresses and identify most frequently occurring keywords. The NDL determination component 126 can generate a set of words that commonly occur across multiple different locations but do not by themselves uniquely identify any particular location (e.g., "university," "apartment," "complex," etc.) and exclude these from the set of NDLs.

In the depicted example, the NDL selection component 135 is configured to divide the incoming address into n-grams. The NDL selection component 135 can then make comparisons between the n-grams and string data associated with the NDLs. Doing so enables the NDL selection component 135 to match the address to closest matching NDL (or NDLs), while filtering out noise such as typographical mistakes and misspellings within the address.

In the depicted embodiment, the NDL selection component 135 is configured to use hybrid machine learning techniques (e.g., Levenshtein distance, Soundex distance, etc.) to filter out noise and suggest NDLs from addresses even when no exact match is found. Using such techniques further allows embodiments to account for spelling mistakes and other minor differences between terms used across multiple addresses. For example, in one embodiment, the NDL selection component 135 could be configured to recognize an NDL of "Aparna Sarovar" which is categorized as a "community," and another landmark of "ABC Central University" which is categorized as a "landmark." If an address is received specifying "1001, Aparna Sarvar, Gowlidowdy, near ABC University, Hyderabad—500032", the NDL selection component 135 could employ hybrid machine learning techniques and could determine that the address contains both the "Aparna Sarovar" and "ABC Central University" landmarks, even though a spelling mistake exists with regard to the first NDL (i.e., the address specifies "Sarvar" rather than "Sarovar"). Doing so enables embodiments to operate in a much more flexible manner when processing customer-specified addresses, thereby improving the technical functionality of the system.

Continuing the example, the NDL selection component 135 could select one of the two NDLs identified within the address to associate with the address. In doing so, the NDL selection component 135 could compare the classifications of the NDLs (i.e., in the present example, "community" versus "landmark") and could determine that the priority value associated with the "community" classification exceeds the priority value associated with the "landmark" classification. In other words, the NDL selection component 135 could determine that the "community" classification is generally a more precise geolocation than the "landmark" classification, and thus could associate the address with the NDL that is classified as a "community" (i.e., the "Aparna Sarovar" NDL).

Figure 4:
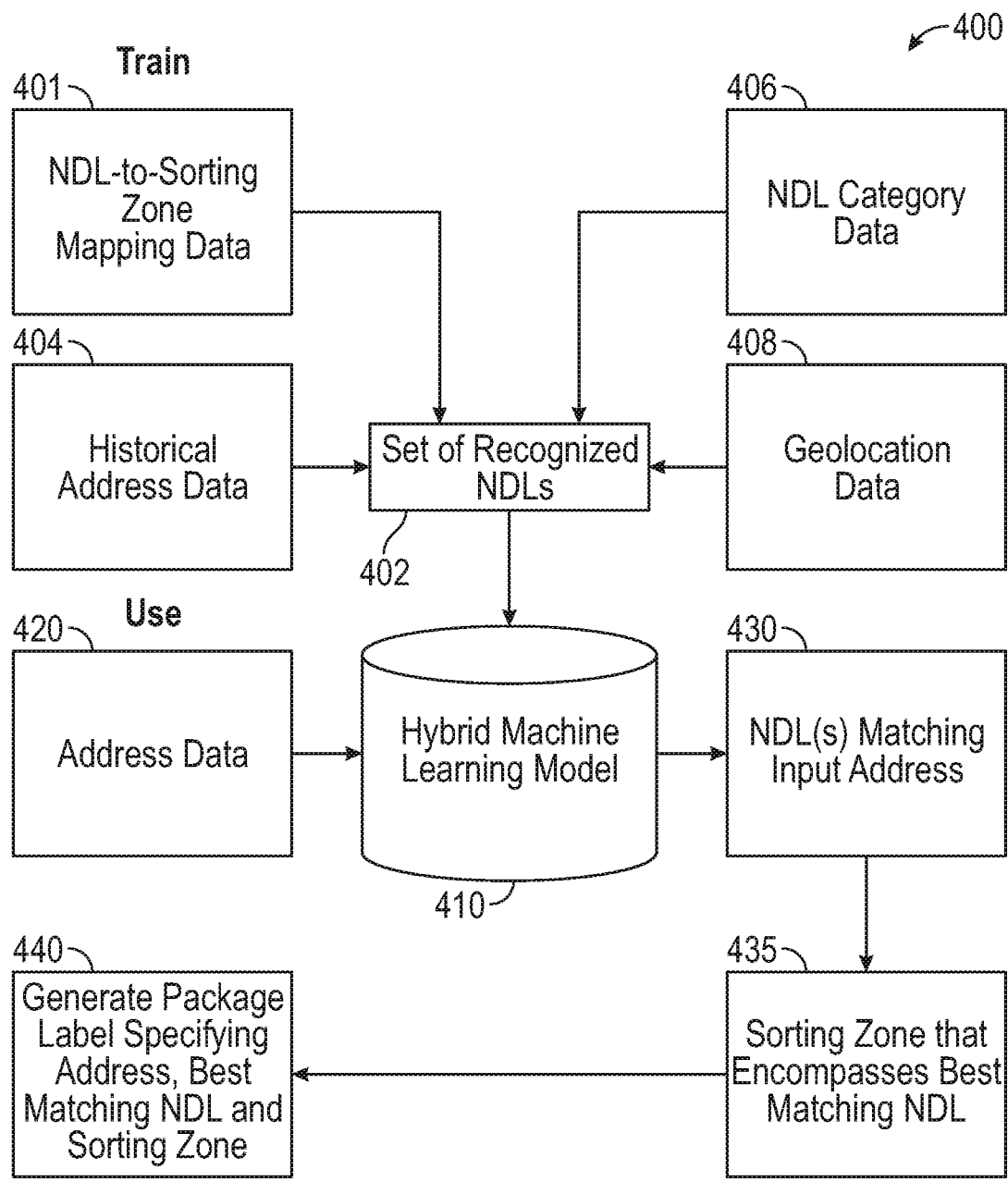
FIG. 4 illustrates a workflow for processing address data to determine a sorting zone for a package, according to one embodiment described herein.

FIG. 4 illustrates a workflow for processing address data to determine a sorting zone for a package, according to one embodiment described herein. As shown, the workflow 400 begins, where the NDL determination component 126 uses NDL-to-sorting zone mapping data 401, historical address data 404 (e.g., the set of all addresses for a particular zip code specified in orders over the last 12 months), NDL category data 406 and geolocation data 408 to generate a set of recognized NDLs 402. In one embodiment, each unique zip code is defined as a separate region, and the NDL determination component 126 is configured to identify a distinct set of NDLs within each region. In other words, in such an embodiment, each zip code corresponds to a respective set of NDLs generated using historical address information for orders within the zip code. In one embodiment, the NDL determination component 126 can continue defining new NDLs until all addresses within the historical address information can be mapped to a NDL.

Additionally, for each NDL, the NDL determination component 126 can define a set of strings that can represent the NDL when used in addresses. For example, the strings "ABC Apartment," "ABC Apartment Complex" and "ABC Apt" could all correspond to the same NDL. Put another way, all of these strings can be defined as corresponding to the same geolocation within the region. Within each zip code (or more generally, within any defined region), the set of NDLs can be unique. So "ABC Apartment" could be defined as a first NDL within a first region (e.g., zip code 12345), and the same value of "ABC Apartment" could be defined as a second, different NDL within a different region (e.g., zip code 23456).

In some regions, geocode information for package deliveries may be unavailable or of such poor quality that it cannot be reliably trusted. As a result, in such regions, associations between different strings can be performed manually. For example, an administrator could access GUI and notate that the strings "ABC Apartment" and "ABC Apartment Building" both correspond to the same NDL. In other locations, where geocode information is more reliable, geocode information can be used to determine that two strings (e.g., "ABC Apartment" and "ABC Apartment Building") correspond to the same NDL (and thus the same geolocation).

In some embodiments, the NDL determination component 126 can use a defined set of rules to automatically generate associations between different strings. For instance, a rule(s) (e.g., specified using a regular expression(s)) could be defined so that the NDL determination component 126 can automatically determine that any strings within a particular region that specify "ABC" and "apartment" are associated. Thus, in such an example, embodiments could automatically determine that the strings "ABC Apartment," "ABC Apartment Complex" and "ABC Apartment Building" all refer to the same NDL. Likewise, additional rules could be created so that the NDL determination component 126 can recognize common abbreviations of particular words and determine that these different strings correspond to the same entity. For example, a rule(s) could be created so that embodiments can determine that the strings "Apartment," "Apt" and "Apt." are essentially synonymous. More generally, any number of different rules and associations can be made, manually, in a partially automated manner or in a fully automated manner, consistent with the functionality described herein.

In one embodiment, the NDLs themselves are classified into one of a plurality of categories. For example, and without limitation, each NDL could be classified as one of a "building," a "community," an "institution," a "landmark," and a "colony." Moreover, embodiments can assign each of the NDLs a respective priority level of a plurality of different priority levels. Such priority levels can be represented using any number of different schemas (e.g., three categories of "high," "medium and "low" priority, a priority level from 1 to 10 with 1 being the lowest priority and 10 being the highest priority, etc.), and generally any suitable manner of representing a priority level can be used, consistent with the functionality described herein.

The NDL determination component 126 can generally use such categories to determine which NDL is best suited for representing a given address. For example, assume that a particular address specifies the strings "near ABC University" and "Building 10." The NDL determination component 126 could determine that "ABC University" corresponds to a first NDL categorized as an institution, and could further determine that "Building 10" corresponds to a second NDL categorized as a "building." In such an example, the NDL determination component 126 could prefer to classify the address using the second NDL categorizes as a "building," as generally the "building" classification provides a more precise geolocation. For example, while a university or more generally an institution campus can span many acres of land, a building will generally have a much smaller footprint. This is evident, as a single institution can include a number of different buildings and landmark. As such, the NDL determination component 126 could classify the exemplary address using the second NDL, thereby resulting in a more precise classification and improving the sortation and routing process.

Returning to the depicted workflow 300, the NDL category data 406 can define a plurality of categorizes for use in categorizing NDLs. In one embodiment, each category has a respective weight associated with it. In one embodiment, the categories are defined based on the type of structure in question (e.g., an institution versus a single building). In a particular embodiment, the categories are defined using size ranges. For example, a first category could be defined as an geographic entity having a radius less than 100 meters, a second category could be defined as an geographic entity having a radius greater than 100 meters but less than 300 meters, a third category could be defined as an geographic entity having a radius greater than 300 meters but less than 500 meters, a fourth category could be defined as an geographic entity having a radius greater than 500 meters but less than 1500 meters, and a fifth category could be defined as an geographic entity having a radius above 1500 meters. In such an embodiment, the NDL determination component 126 could be configured with a preference for the most precise geographic region (i.e., in such an embodiment, the first category would be preferred above all the other categories, the second category would be preferred above all except the first category, etc.).

In the depicted embodiment, the set of recognized NDLs 402 and address data 420 for an order in question are processed by a hybrid machine learning model 410 to determine an NDL(s) matching the address data (operation 430). In doing so, the NDL determination component 126 can take into account not only weights associated with categorizes assigned to the various NDLs in the set of recognized NDLs, but the NDL determination component 126 can also take into account a confidence value output by the hybrid machine learning model 410. As an example, if the NDL determination component 126 determines that the output of the hybrid machine learning model 410 indicates a moderate level of confidence that an address corresponds to a first NDL categorized in the second category and highly confident that the address corresponds to a second NDL categorized in the third category, embodiments could associate the address with the second NDL based on the higher confidence value, even though the third category is less precise than the second category.

Once best matching NDL is identified and assigned to a package, the NDL determination component 126 can group packages into sort zones based on their assigned NDLs (operation 435). Generally, each sort zone corresponds to a geographic region and each sort zone can be associated with one or more NDLs that are included within the geographic region. The NDL determination component 126 can then generate a package label specifying the specified address as well as the assigned NDL and sort zone, and attach such labels to the packages (operation 440). This information can be used to facilitate the sortation and routing of the package. For instance, a sorting system (e.g., an automated sorting system, a partially automated or manual sorting operation carried out through the assistance of sort associates, etc.) could sort packages into physical bins or other containers, based on the sort zones specified on the generated labels. For example, one or more bins or other containers could be provided for each of the recognized sort zones, and the sorting system could facilitate the placement of the packages into the corresponding bin or other container. These containers could then be transported to the geographic region corresponding to the sort zone, where, e.g., another sorting operation could be performed to further route the packages to sub-regions within the geographic region or to hand the packages off to customer-facing delivery personnel or other delivery systems. Through the use of NDLs and sort zones, embodiments can effectively remove the requirement for sorting systems to have localized knowledge of various geographic regions and can enable the efficient and reliable processing of packages with relatively unstructured addresses.

If the NDL determination component 126 is ultimately unable to resolve an address to an NDL, the NDL determination component 126 can route the package for manual processing. In such a scenario, the NDL determination component 126 could not assign any sort zone to the package. This may be the case with very poorly formatted addresses or potentially addresses that include very infrequently used descriptions. If manual processing is ultimately unsuccessful, the system could generate a notification to the customer that provided the address, requesting clarification or a new address for the delivery of the package.

In one embodiment, the set of NDLs can change over time. For example, the NDL creation component 215 of the NDL determination component 126 could periodically refresh the set of NDLs for each zip code (e.g., based on data at the time within a most recent window of time, such as the past 6 months).

In a particular embodiment, to generate sort zones, the clustering component 128 is configured to use a k-means clustering algorithm (or a derivative thereof). As an example, assume that the NDL creation component 215 identifies 3,000 distinct NDLs in a given region (e.g., defined by a zip code). The clustering component 128 can initialize with the assumption that each NDL corresponds to a respective sort zone, and thus initialize with 3,000 different sort zones. As the algorithm proceeds, nearby sort zones can be merged into a single sort zone. The clustering component 128 can continue performing the clustering algorithm, until an optimal number of sort zones is reached.

In one embodiment, the optimal number of sort zones is determined by the amount of physical space within the delivery center. For example, if a particular delivery center has physical space for 100 different bins, each corresponding to a respective sort zone, the optimal number of sort zones could be set to 100, and the k-means clustering algorithm could continue iterating and combining sort zones until the optimal number of 100 sort zones is achieved. More generally, however, any number of different ways of determining the optimal number of sort zones can be used, consistent with the functionality described herein.

Figure 5:
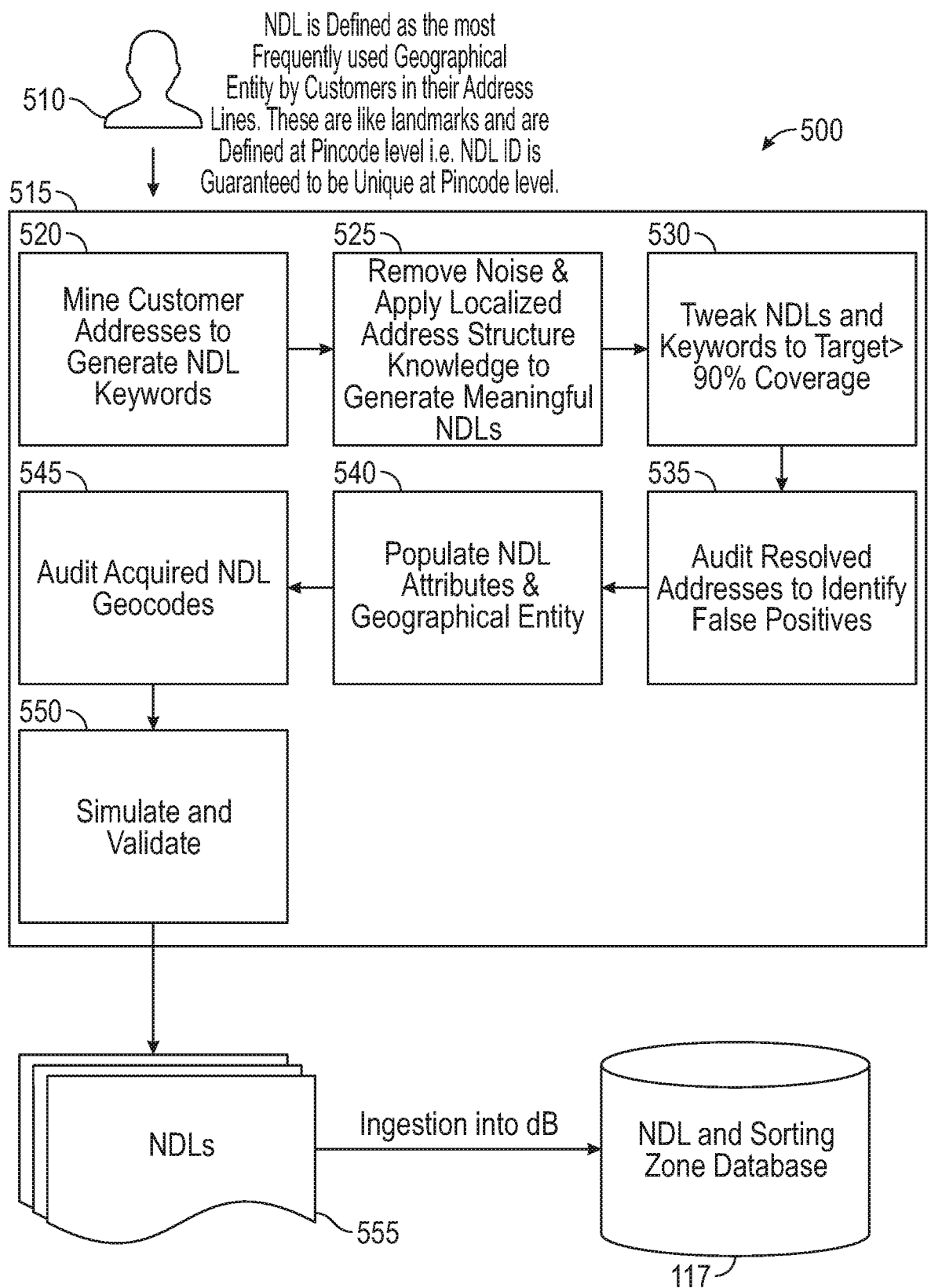
FIG. 5 illustrates a workflow for generating a set of NDLs, according to one embodiment described herein.

FIG. 5 illustrates a workflow for generating a set of NDLs, according to one embodiment described herein. As shown in the depicted embodiment, the method 500 begins at block 510, where an operation 515 is initiated to define a set of NDLs. The sorting zone generation engine 116 mines historical customer orders to fetch address (e.g., addresses from the previous 6 months' orders) to generate NDL keywords (block 520). The sorting zone generation engine 116 can identify commonly used words from the set of addresses to create NDL keywords, which can then be processed to remove noise and generate a set of more meaningful NDLs (block 525).

For example, the sorting zone generation engine 116 could determine that the word "street" should be classified as a meaningless word, even though the word "street" may appear in numerous addresses, because the mere presence of the word "street" within an address within a region does not uniquely identify any one geolocation within the region. The sorting zone generation engine 116 can refine the precision of the set of NDLs to ensure the generated set of NDLs for a given zip code provides at least a threshold level of coverage (e.g., 90% area coverage, where 90% of addresses from historical customer orders map to one or more NDLs in the generated set of NDLs). Additionally, in block 535, a manual audit can be performed to ensure that false positives are identified based on localized knowledge of the geographic area.

A final set of NDLs can then be physically visited and geolocations can be captured, and the sorting zone generation engine 116 populates the attributes and geographical entities (block 540). In the depicted embodiment, an audit operation is then performed on the final set of NDLs (block 545). For example, a manual audit operation could be performed. A sort zone generation simulation could then be performed using the final set of NDLs to check if packages can be accurately mapped to NDLs and sorted to correct sort zones for future allocation (block 550). In the depicted embodiment, the remaining NDLs 555 for which the simulation operation was successful are stored in the NDL and sorting zone database 118.

Figure 6:
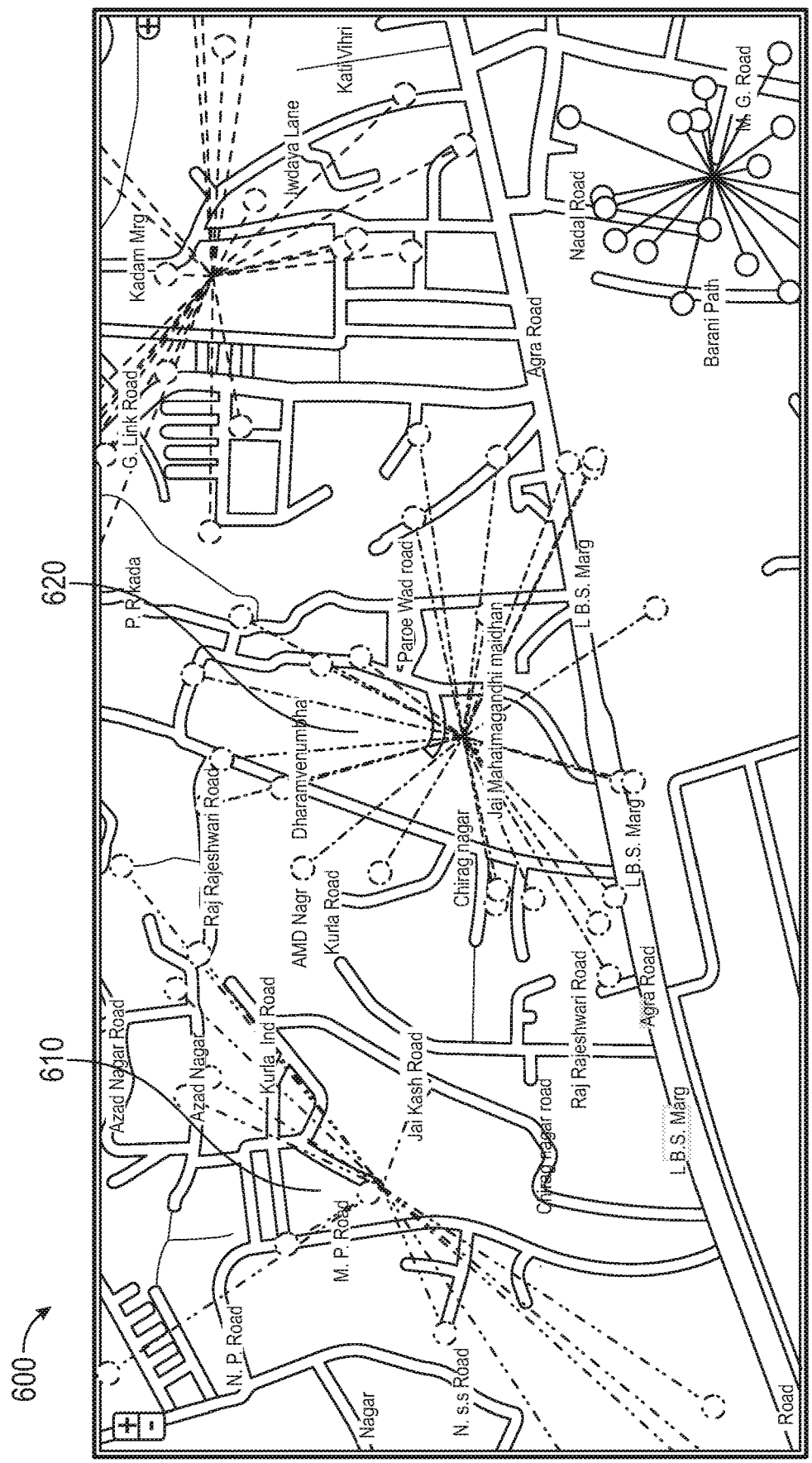
FIG. 6 illustrates a graphical depiction of clusters of geolocations for NDLs, according to one embodiment described herein.

FIG. 6 illustrates a graphical depiction of clusters of geolocations for NDLs, according to one embodiment described herein. As shown, the graphical depiction 600 illustrates several clusters of geolocations, including a first cluster 610 and a second cluster 620. In the illustrated embodiment, the clustering component 128 has reduced the set of NDLs for a zip code down to a set of geolocation clusters, which correspond to sorting zones. As discussed above, the clustering component 128 can reduce the total set of NDLs (e.g., which can number in the thousands) down to a smaller number of sorting zones (e.g., less than a hundred). As a shipping center may provide a separate sorting bin to hold packages destined for each sorting zone, reducing the number of geographic regions the packages are routed to reduce the number of sorting bins required and thus the amount of physical space required to house the sorting bins. Additionally, by clustering the NDLs into the sorting zones, the clustering component 128 can enable the more efficient transport of the packages to their corresponding sorting zone. That is, rather than taking one or perhaps a small number of packages to a NDL directly, a large bin of packages can be transported at once to a delivery facility for a sorting zone, where the packages can then be further divided and routed towards their ultimate destination.

Figure 7:
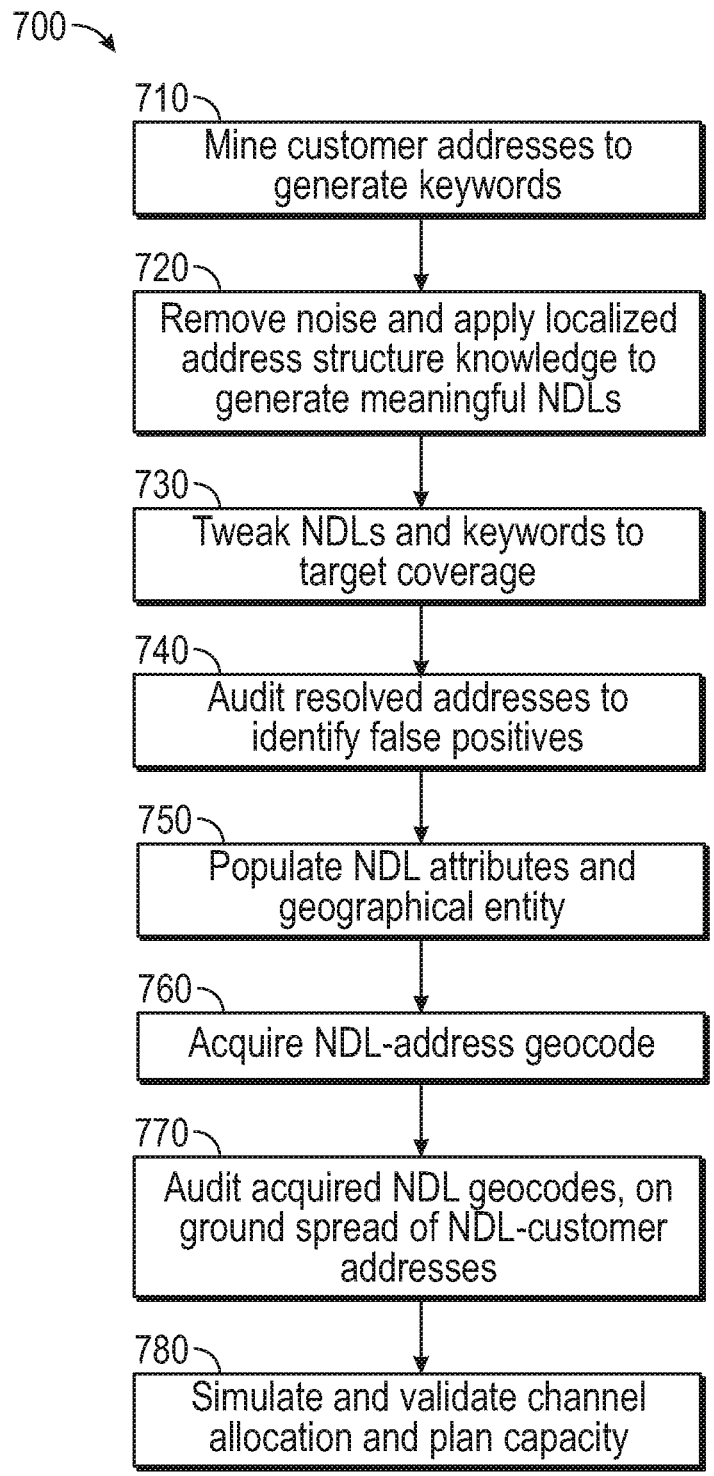
FIG. 7 is a workflow for generating a set of NDLs for a geographic region, according to one embodiment described herein.

FIG. 7 is a workflow for generating a set of NDLs for a geographic region, according to one embodiment described herein. As shown, the workflow 700 begins at block 710, where the sorting zone generation engine 116 mines customer addresses to generate a set of commonly used keywords. The sorting zone generation engine 116 removes noise and applies localized address structure knowledge to generate a set of meaningful NDLs (block 720). For example, the sorting zone generation engine 116 could utilize algorithms such as Levenshtein distance to remove noise from comparisons between words. At block 730), the sorting zone generation engine 116 tweaks the set of NDLs and keywords to ensure target coverage over a threshold level of coverage (e.g., 90% coverage). In doing so, the sorting zone generation engine 116 can provide a graphical user interface through which one or more users of the sorting zone generation engine 116 can manually modify the NDLs and/or keywords to ensure adequate coverage within the region.

Additionally, the sorting zone generation engine 116 performs an audit operation on resolved addresses to identify one or more false positives (block 740). For example, the sorting zone generation engine 116 could determine a particular keyword is a false positive, where the word is used frequently in addresses but does not uniquely identify any geolocation. For example, the word "avenue" could be a commonly used term in addresses, but a region can contain many street names that contain the word "avenue" and the mere presence of the word avenue would not uniquely identify any one particular street in such an example.

Once false positives are eliminated, the sorting zone generation engine 116 populates NDL attributes and geographical entities (block 750). Additionally, in the depicted embodiment, the sorting zone generation engine 116 acquires NDL address geocodes (block 760). In one embodiment, the sorting zone generation engine 116 provides an interface through which one or more users can manually specify the geocode data for the NDLs. The sorting zone generation engine 116 performs a second audio operation on the acquired NDL geocodes (block 770) and performs a simulation, at block 780, where the sorting zone generation engine 116 tests the defined set of NDLs and sort zones to ensure optimal item sortation. For example, the sorting zone generation engine 116 could retrieve a set of historical order data (e.g., all orders within the region during a historical 24 hour period) and the sorting zone generation engine 116 could allocate the historical packages to sort zones using the defined NDLs. The sorting zone generation engine 116 could then determine the accuracy and adequacy of the defined NDLs and sort zones, based on the allocation of the packages versus historical geolocation delivery information for the packages.

Figure 8:
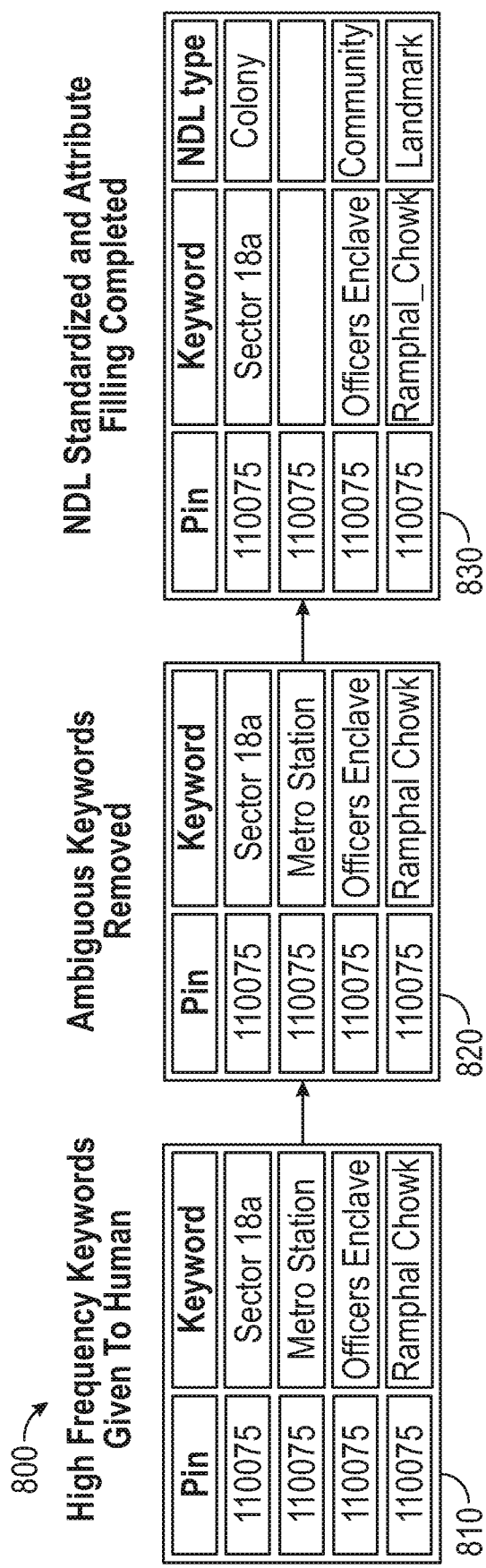
FIG. 8 illustrates a workflow for filtering a set of commonly used words down to a set of categorized NDLs, according to one embodiment described herein.

FIG. 8 illustrates a workflow for filtering a set of commonly used words down to a set of categorized NDLs, according to one embodiment described herein. As shown, the workflow 800 begins at table 810, where the NDL determination component 126 has determined a list of frequently used keywords in addresses over a historical window of time. In the depicted example, only a small subset of the identified keywords are shown for illustrative purposes, and these keywords include "sector 18a," "metro station," "officers enclave" and "ramphal chowk." The NDL determination component 126 can then perform an operation to remove any ambiguous keywords from the table 810, and the results of this filtering operation are shown in table 820. In the depicted embodiment, the NDL determination component 126 has determined to remove the keyword "metro station" as a result of this keyword being classified as ambiguous. For example, if the zip code (or other geographic region) corresponding to the set of keywords contains multiple different metro stations, a description of "near the metro station" may be relatively useless for routing a package, as "metro station" can refer to multiple different metro stations and thus is ambiguous. In one embodiment, the NDL determination component 126 is configured to present the identified keywords via a graphical user interface, and a user can utilize an input device(s) (e.g., a mouse, a touchscreen, a voice interface, etc.) to identify any keywords that should be considered ambiguous. The NDL determination component 126 could then filter the identified ambiguous keywords from the list of high frequency keywords.

The NDL determination component 126 can then generate standardized NDLs using the remaining keywords and can populate attribute values for the generated NDLs (shown in table 830). For example, an NDL can include a geolocation attribute and can also include a categorization attribute. Doing so enables the NDL determination component 126 to select between multiple NDLs that all correspond to a given address (e.g., by prioritizing the NDLs using weights corresponding to the assigned categories).

Figure 9:
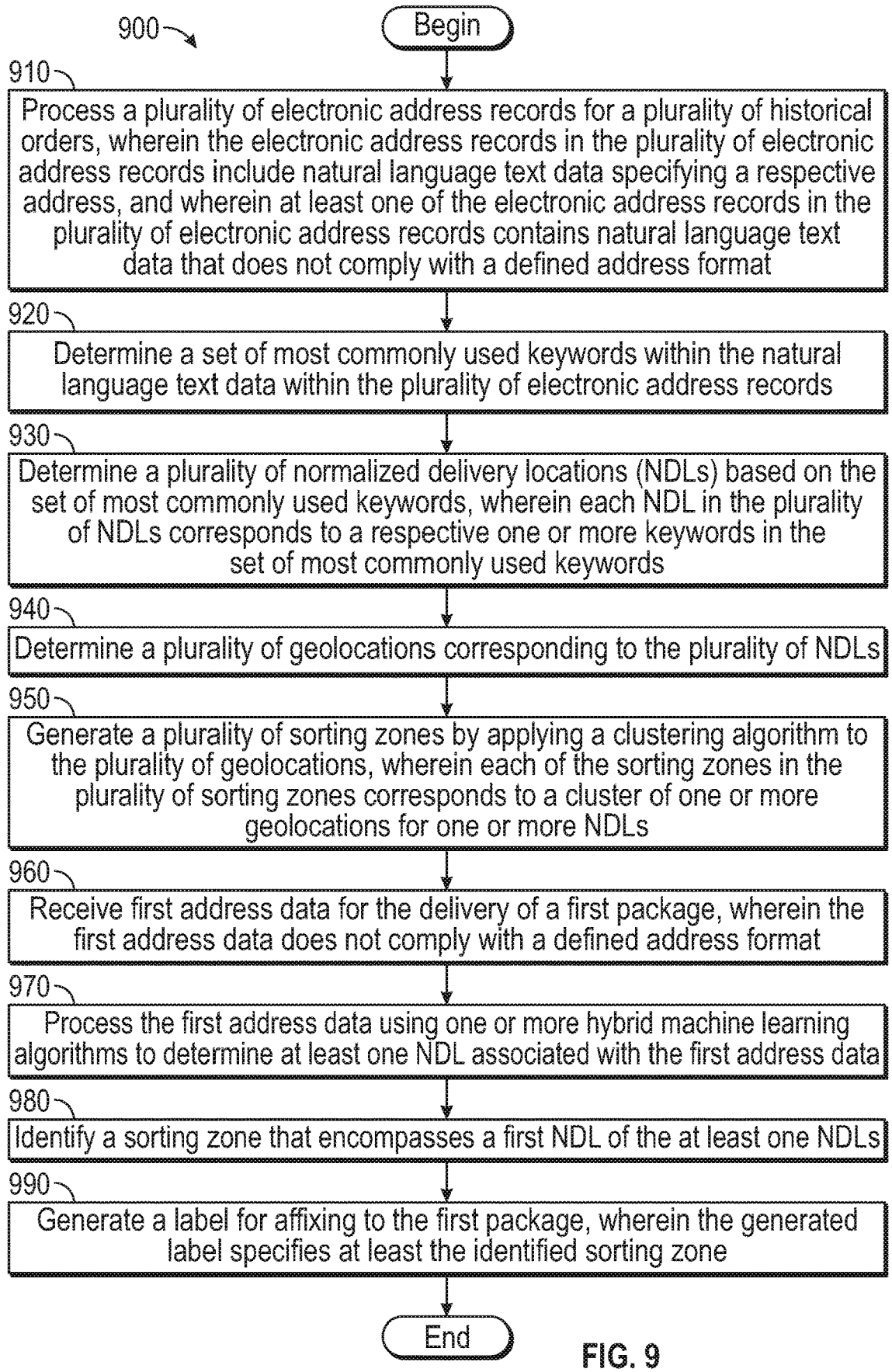
FIG. 9 is a flow diagram illustrating a method for generating a label that specifies an identified sorting zone and for affixing to a package, according to one embodiment described herein.

FIG. 9 is a flow diagram illustrating a method for generating a label that specifies an identified sorting zone and for affixing to a package, according to one embodiment described herein. As shown, the method 900 begins at block 910, where the sorting zone generation engine 116 processes a plurality of electronic address records for a plurality of historical orders, where the electronic address records in the plurality of electronic address records include natural language text data specifying a respective address, and where at least one of the electronic address records in the plurality of electronic address records contains natural language text data that does not comply with a defined address format.

The sorting zone generation engine 116 determines a set of most commonly used keywords within the natural language text data within the plurality of electronic address records (block 920). Additionally, the sorting zone generation engine 116 determines a plurality of Normalized Delivery Locations (NDLs) based on the set of most commonly used keywords, where each NDL in the plurality of NDLs corresponds to a respective one or more keywords in the set of most commonly used keywords (block 930). The sorting zone generation engine 116 further determines a plurality of geolocations corresponding to the plurality of NDLs (block 940). The sorting zone generation engine 116 then generates a plurality of sorting zones by applying a clustering algorithm to the plurality of geolocations, where each of the sorting zones in the plurality of sorting zones corresponds to a cluster of one or more geolocations for one or more NDLs (block 950).

At a subsequent point in time, the sorting zone runtime engine 114 receives first address data for the delivery of a first package, where the first address data does not comply with a defined address format (block 960). The sorting zone runtime engine 114 processes the first address data using one or more hybrid machine learning algorithms to determine at least one NDL associated with the first address data (block 970). The sorting zone runtime engine 114 identifies a sorting zone that encompasses a first NDL of the at least one NDLs (block 980). The sorting zone runtime engine 114 generates a label for affixing to the first package, where the generated label specifies at least the identified sorting zone (block 990), and the method 900 ends.

Figure 10:
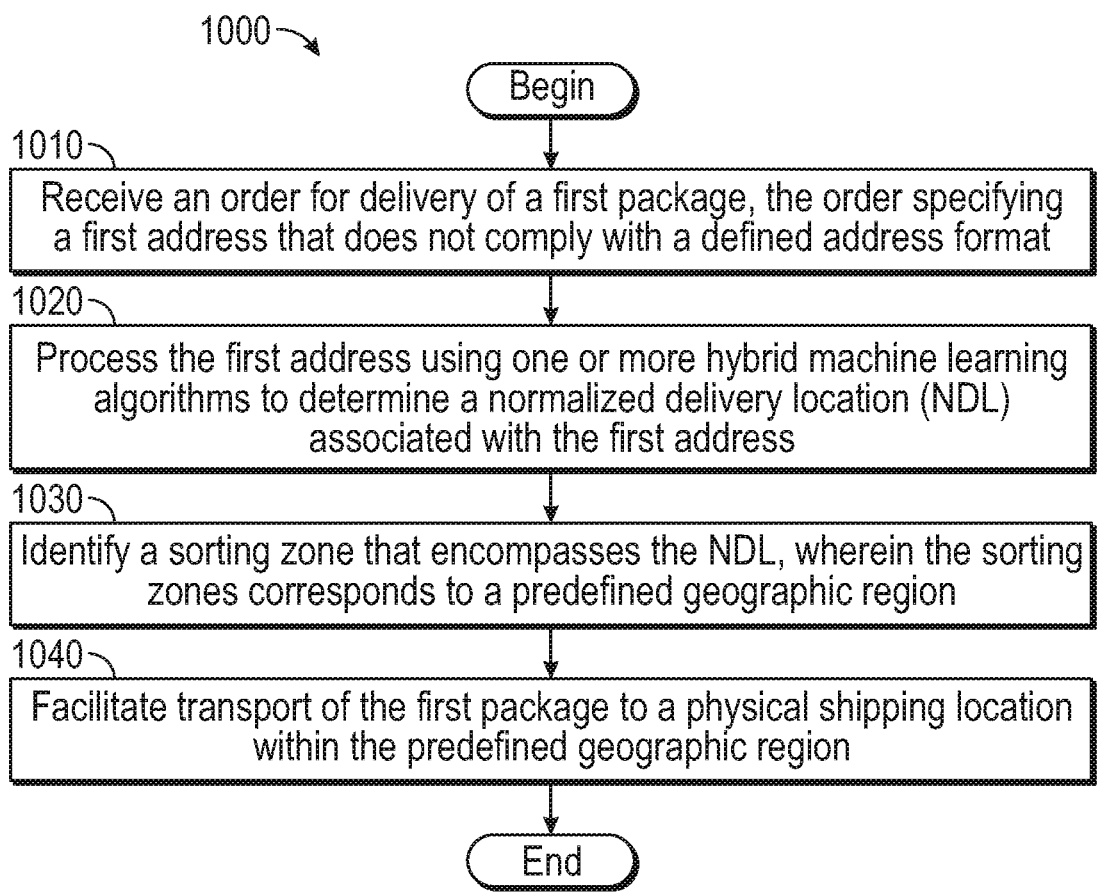
FIG. 10 is a flow diagram illustrating a method for facilitating transport of a package using a NDL determined through the use of one or more hybrid machine learning algorithms, according to one embodiment described herein.

FIG. 10 is a flow diagram illustrating a method for facilitating transport of a package using a NDL determined through the use of one or more hybrid machine learning algorithms, according to one embodiment described herein. As shown, the method 1000 begins at block 1010, where the sorting zone runtime engine 114 receives an order for delivery of a first package, the order specifying a first address that does not comply with a defined address format. The sorting zone runtime engine 114 processes the first address using one or more hybrid machine learning algorithms to determine a Normalized Delivery Location (NDL) associated with the first address (block 1020). In one embodiment, the sorting zone runtime engine 114 determines that two or more NDLs are associated with the first address, and the sorting zone runtime engine 114 is configured to select the NDL from the two or more NDLs having the highest priority. For instance, the sorting zone runtime engine 114 could select the NDL which most precisely identifies the delivery location. As an example, if the sorting zone runtime engine 114 determines that an address corresponds to both a university campus NDL and a particular building NDL, the sorting zone runtime engine 114 could select the building NDL, as the identification of a particular building on the campus is more precise.

Additionally, the sorting zone runtime engine 114 identifies a sorting zone that encompasses the NDL, wherein the sorting zones corresponds to a predefined geographic region (block 1030). The sorting zone runtime engine 114 facilitates transport of the first package to a physical shipping location within the predefined geographic region (block 1040), and the method 1000 ends.

Figure 11:
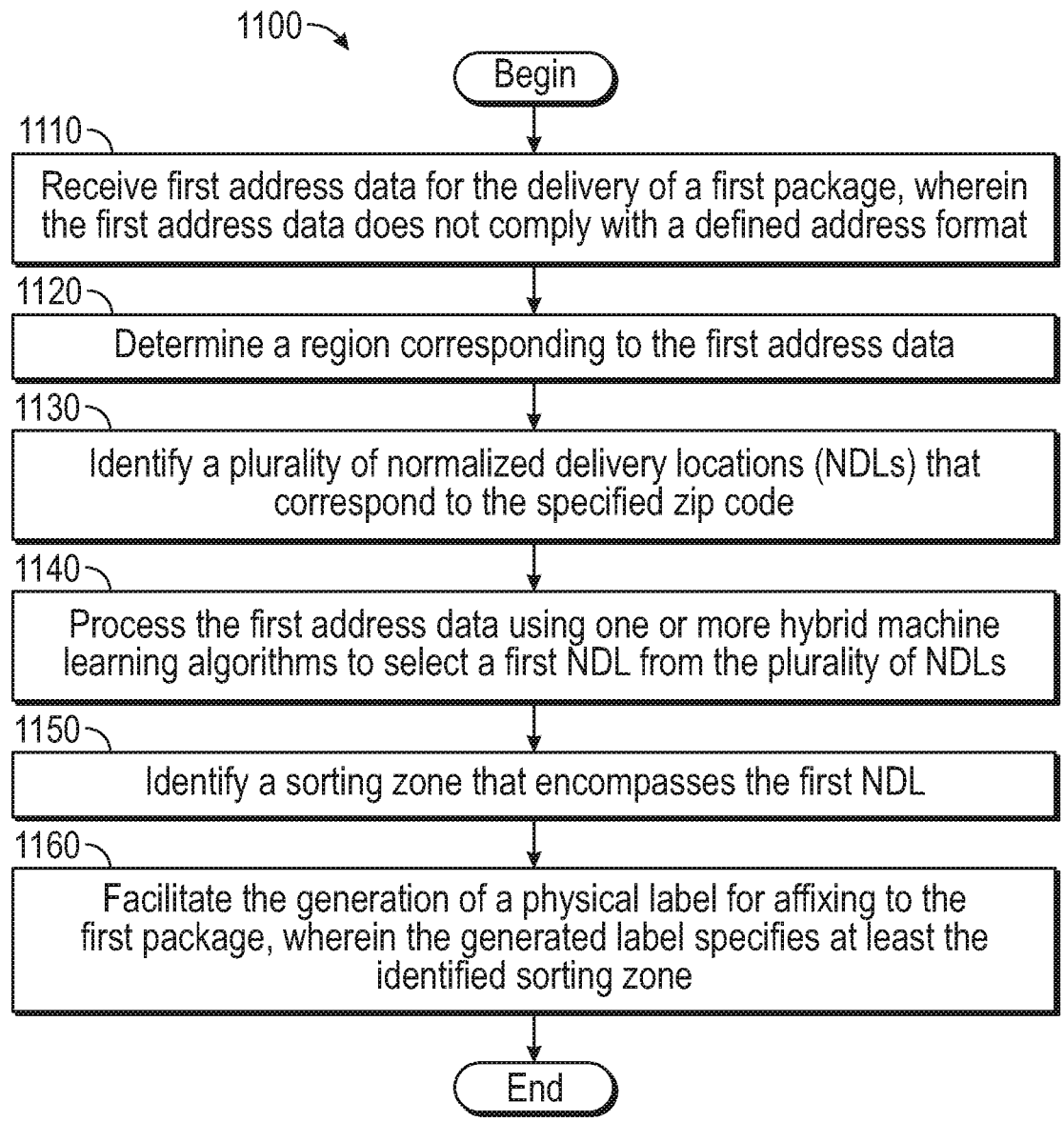
FIG. 11 is a flow diagram illustrating a method for determining a sorting zone for an address using a plurality of NDLs specific to a zip code of the address, according to one embodiment described herein.

FIG. 11 is a flow diagram illustrating a method for determining a sorting zone for an address using a plurality of NDLs specific to a region corresponding to the address, according to one embodiment described herein. As shown, the method 1100 begins at block 1110, where the sorting zone runtime engine 114 receives first address data for the delivery of a first package, where the first address data does not comply with a defined address format. The sorting zone runtime engine 114 determines a region corresponding to the first address data (block 1120) and identifies a plurality of Normalized Delivery Locations (NDLs) that correspond to the specified zip code (block 1130).

The sorting zone runtime engine 114 processes the first address data using one or more hybrid machine learning algorithms to select a first NDL from the plurality of NDLs (block 1140). As discussed above, in some instances, the sorting zone runtime engine 114 could determine two or more NDLs that correspond to the first address data and the sorting zone runtime engine 114 can select one or the two or more NDLs for use in sorting and routing the package. Additionally, the sorting zone runtime engine 114 identifies a sorting zone that encompasses the first NDL (block 1150). The sorting zone runtime engine 114 facilitates the generation of a physical label for affixing to the first package, where the generated label specifies at least the identified sorting zone (block 1160), and the method 1100 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an unstructured address processing component 112) or related data available in the cloud. For example, the unstructured address processing component 112 could execute on a computing system in the cloud and upon receiving an address for a package for processing, the unstructured address processing component 112 could transmit the address to a sorting zone assignment engine 114 to determine a sorting zone for use in routing the package. In such a case, the sorting zone assignment engine 114 could determine an NDL corresponding to the address and could determine a sorting zone that encompasses the determined NDL. The unstructured address processing component 112 could then facilitate the generation of a shipping label specifying the determined sorting zone and could store such a label at a storage location in the cloud (e.g., for eventual consumption by a label printing component). Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
processing a plurality of electronic address records for a plurality of historical orders, wherein electronic address records in the plurality of electronic address records include natural language text data specifying a respective address, and wherein at least one of the electronic address records in the plurality of electronic address records contains natural language text data that does not comply with a defined address format;
determining a set of most commonly used keywords within the natural language text data within the plurality of electronic address records;
determining a plurality of Normalized Delivery Locations (NDLs) based on the set of most commonly used keywords, wherein each NDL in the plurality of NDLs corresponds to a respective one or more keywords in the set of most commonly used keywords;
determining a plurality of geolocations corresponding to the plurality of NDLs;
generating a plurality of sorting zones by applying a clustering algorithm to the plurality of geolocations, wherein each of the plurality of sorting zones corresponds to a cluster of one or more geolocations for one or more NDLs;
receiving first address data for delivery of a first package, wherein the first address data does not comply with a defined address format;
processing the first address data using one or more hybrid machine learning algorithms to determine at least one NDL associated with the first address data;
identifying a sorting zone that encompasses a first NDL of the at least one NDLs; and
generating a label for affixing to the first package, wherein the generated label specifies at least the identified sorting zone.

2. The method of claim 1, wherein processing the first address data using the one or more hybrid machine learning algorithms to determine the at least one NDL associated with the first address data comprises:
dividing the first address data into a first plurality of n-grams; and
performing a comparison between the first plurality of n-grams and a second plurality of n-grams associated with the at least one NDL.

3. The method of claim 2, wherein processing the first address data using the one or more hybrid machine learning algorithms to determine the at least one NDL associated with the first address data further comprises:
calculating a Levenshtein distance between the first plurality of n-grams and the second plurality of n-grams; and
determining that the first address data corresponds to the at least one NDL, based at least in part on the calculated Levenshtein distance.

4. The method of claim 1, further comprising:
outputting the generated label to a printer device to generate a physical label for the first package; and
facilitating sorting of the first package to a container corresponding to the identified sorting zone, using the physical label.

5. The method of claim 4, wherein the container is adapted to store the first package to be transported to a physical location within a geographic region corresponding to the identified sorting zone.

6. The method of claim 1, wherein processing the first address data using the one or more hybrid machine learning algorithms to determine the at least one NDL associated with the first address data comprises:
  determining two or more NDLs of a plurality of NDLs, that correspond to the first address data;
  determining two or more weights associated with the two or more NDLs; and
  selecting the at least one NDL, from the two or more NDLs, based on the determined two or more weights.

7. The method of claim 6, wherein processing the first address data using the one or more hybrid machine learning algorithms to determine the at least one NDL associated with the first address data further comprises:
  determining two or more confidence values representing strengths of associations between the two or more NDLs and the first address data,
  wherein selecting the at least one NDL, from the two or more NDLs, is further based on the determined two or more confidence values, and
  wherein determining the two or more weights associated with the two or more NDLs further comprises:
    determining, for each NDL of the two or more NDLs, a respective category of a plurality of predefined categories that corresponds to the NDL, wherein each of the plurality of predefined categories represents a geographic region of a defined size; and
    retrieving a predefined weight related to the determined category, wherein a magnitude of the predefined weight corresponds to the defined size of the represented geographic region.

8. A system, comprising:
  one or more computer processors; and
  a memory containing computer program code that, when executed by operation of the one or more computer processors, performs an operation comprising:
    receiving an order for delivery of a first package, the order specifying a first address that does not comply with a defined address format;
    processing the first address using one or more hybrid machine learning algorithms to determine a Normalized Delivery Location (NDL) associated with the first address, the NDL comprising a natural language text description of a landmark associated with the first address;
    identifying a sorting zone that encompasses the NDL, wherein the sorting zones corresponds to a predefined geographic region; and
    facilitating transport of the first package to a physical shipping location within the predefined geographic region.

9. The system of claim 8, wherein processing the first address using the one or more hybrid machine learning algorithms to determine the NDL associated with the first address comprises:
  determining two or more NDLs of a plurality of NDLs, that correspond to the first address;
  determining two or more weights associated with the two or more NDLs; and
  selecting the NDL, from the two or more NDLs, based on the determined two or more weights.

10. The system of claim 9, wherein processing the first address using the one or more hybrid machine learning algorithms to determine the NDL associated with the first address further comprises:
  determining two or more confidence values representing strengths of associations between the two or more NDLs and the first address,
  wherein selecting the NDL, from the two or more NDLs, is further based on the determined two or more confidence values.

11. The system of claim 9, determining the two or more weights associated with the two or more NDLs further comprises:
  determining, for each NDL of the two or more NDLs, a respective category of a plurality of predefined categories that corresponds to the NDL, wherein each of the plurality of predefined categories represents a geographic region of a defined size; and
  retrieving a predefined weight related to the determined category, wherein a magnitude of the predefined weight corresponds to the defined size of the represented geographic region.

12. The system of claim 8, the operation further comprising:
  processing a plurality of electronic address records for a plurality of historical orders, wherein electronic address records in the plurality of electronic address records include natural language text data specifying a respective address, and wherein at least one of the electronic address records in the plurality of electronic address records contains natural language text data that does not comply with a defined address format; and
  determining a plurality of NDLs based on the natural language text data within the plurality of electronic address records, the plurality of NDLs being inclusive of the determined NDL.

13. The system of claim 12, the operation further comprising:
  for each of the plurality of NDLs, determining a set of corresponding phrases of one or more words;
  determining a plurality of geolocations corresponding to the plurality of NDLs; and
  generating a plurality of sorting zones by applying a clustering algorithm to the plurality of geolocations, wherein each of the plurality of sorting zones corresponds to a cluster of one or more geolocations for one or more NDLs.

14. The system of claim 13, wherein facilitating the transport of the first package to the physical shipping location within the predefined geographic region further comprises:
  generating a label for affixing to the first package, wherein the generated label specifies at least the identified sorting zone.

15. A non-transitory computer-readable medium containing computer program code that, when executed by operation of one or more computer processors, performs an operation comprising:
  receiving first address data for delivery of a first package, wherein the first address data does not comply with a defined address format;
  determining a region corresponding to the first address data;
  identifying a plurality of Normalized Delivery Locations (NDLs) that correspond to the region;
  processing the first address data using one or more hybrid machine learning algorithms to select a first NDL from the plurality of NDLs, wherein the first NDL comprises a natural language text description of a landmark associated with the first address data;
  identifying a sorting zone that encompasses the first NDL; and facilitating generation of a physical label for affixing to the first package, wherein the physical label specifies at least the identified sorting zone.

16. The non-transitory computer-readable medium of claim 15, wherein the region corresponding to the first address data corresponds to a city, a country, a county, a zip code or a sub-zip code region, and the operation further comprising:

processing a plurality of electronic address records for a plurality of historical orders, wherein the plurality of historical orders correspond to the zip code, wherein electronic address records in the plurality of electronic address records include natural language text data specifying a respective address, and wherein at least one of the plurality of electronic address records contains natural language text data that does not comply with a defined address format; and determining the plurality of NDLs based on the natural language text data within the plurality of electronic address records.

17. The non-transitory computer-readable medium of claim 16, the operation further comprising:

for each of the plurality of NDLs, determining a set of corresponding phrases of one or more words;

determining a plurality of geolocations corresponding to the plurality of NDLs; and generating a plurality of sorting zones by applying a clustering algorithm to the plurality of geolocations, wherein each of the plurality of sorting zones corresponds to a cluster of one or more geolocations for one or more NDLs, and wherein the plurality of sorting zones includes the identified sorting zone that encompasses the first NDL.

18. The non-transitory computer-readable medium of claim 17, the operation further comprising:

categorizing each of the plurality of NDLs into one of a plurality of predefined categories, wherein each of the plurality of predefined categories corresponds to a geographic region of a respective size; and assigning a respective weight to each of the plurality of predefined categories, based on the size of the corresponding geographic region.

19. The non-transitory computer-readable medium of claim 15, the operation further comprising:

determining a plurality of weights associated with the plurality of NDLs, and wherein processing the first address data using the one or more hybrid machine learning algorithms to select the first NDL from the plurality of NDLs is further based on the determined plurality of weights.

20. The non-transitory computer-readable medium of claim 19, wherein processing the first address data using the one or more hybrid machine learning algorithms to select the first NDL from the plurality of NDLs further comprises:

determining, for each NDL of the plurality of NDLs, a respective category of a plurality of predefined categories that corresponds to the NDL, wherein each of the plurality of predefined categories represents a geographic region of a defined size; and retrieving a predefined weight related to the determined category, wherein a magnitude of the predefined weight corresponds to the defined size of the represented geographic region.

\* \* \* \* \*